Figure 1:
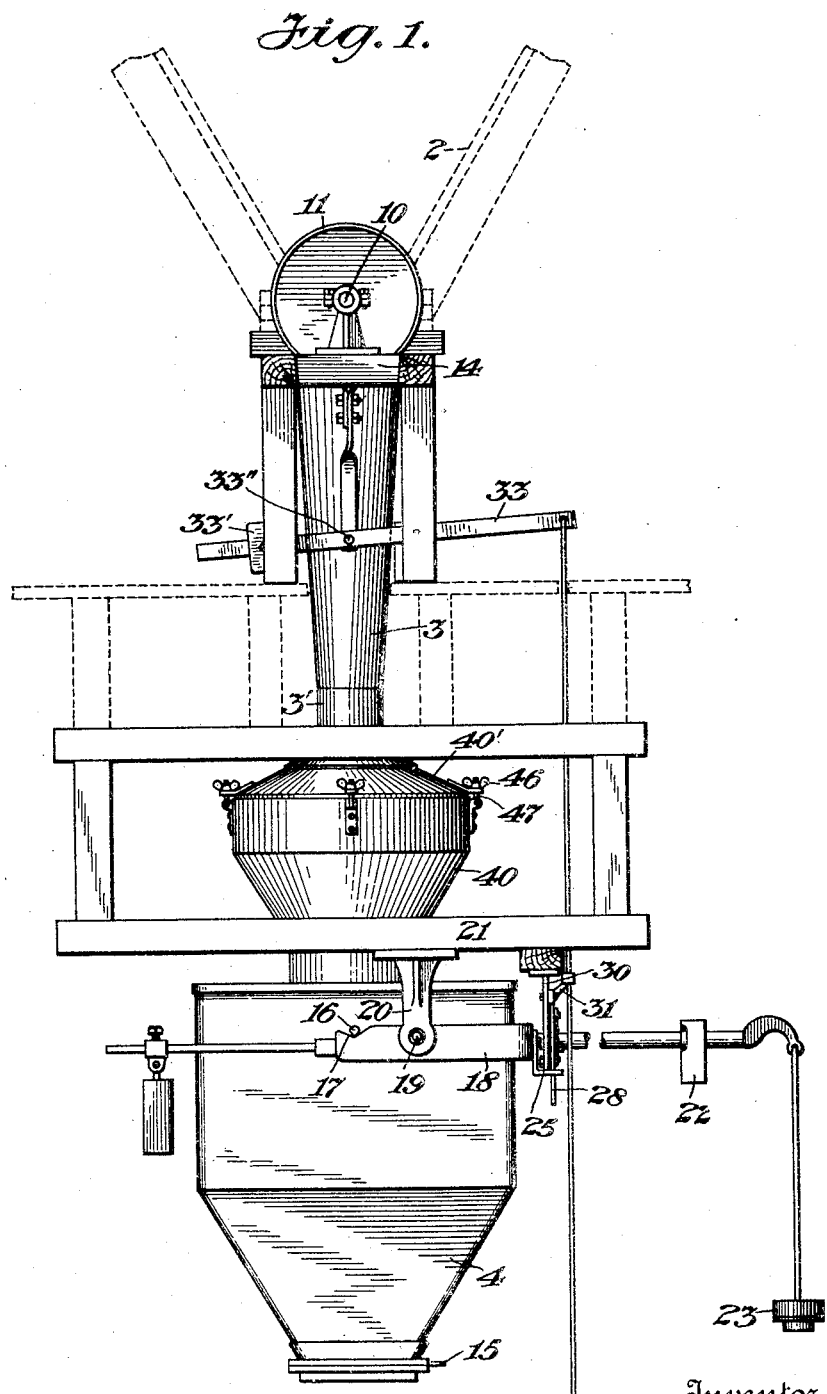

No. 779,650. PATENTED JAN. 10, 1905.
G. J. HICKS.
AUTOMATIC WEIGHING MACHINE.
APPLICATION FILED APR. 26, 1903.

3 SHEETS—SHEET 1.

Witnesses
CW Smith
E. Faith

Inventor
George J. Hicks
By his Attorney

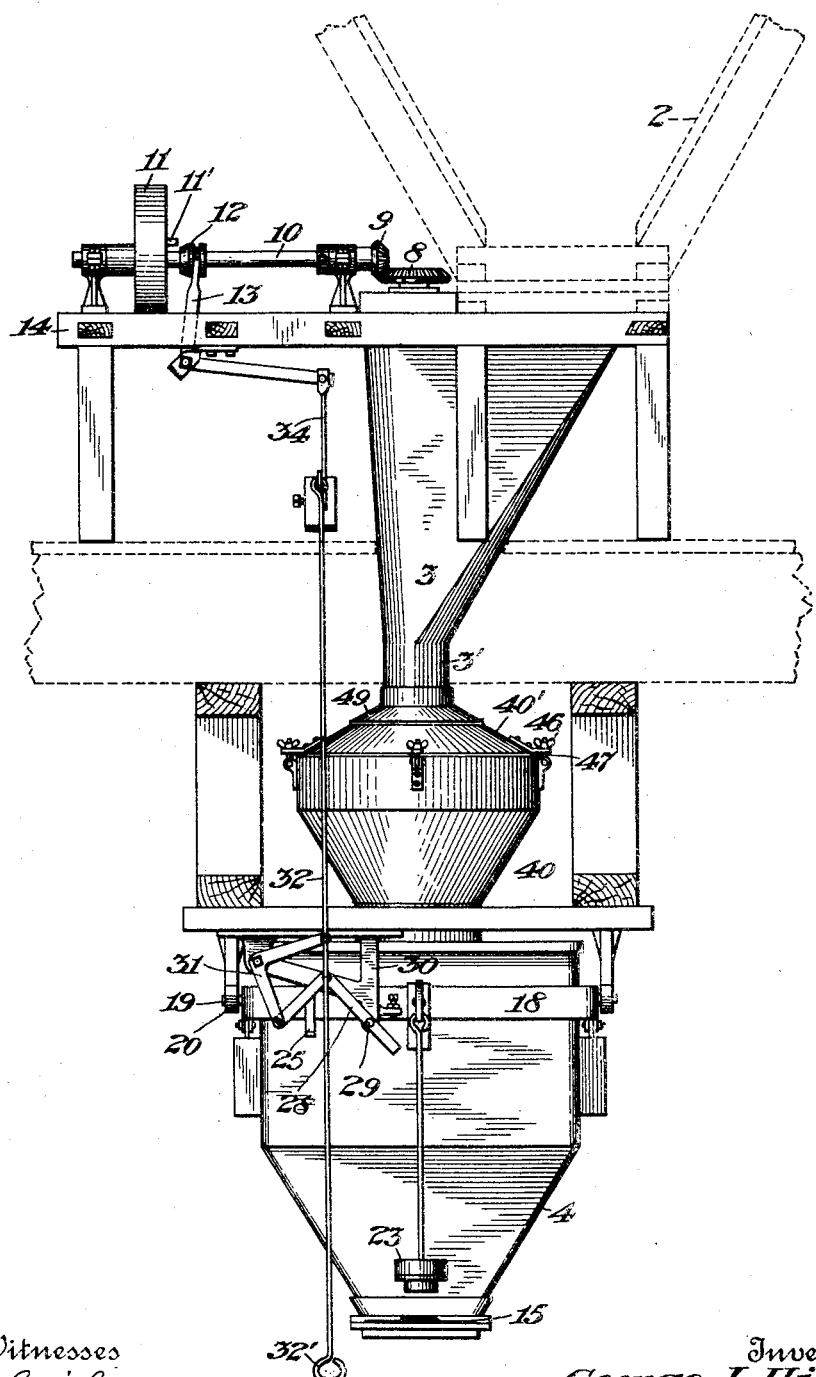

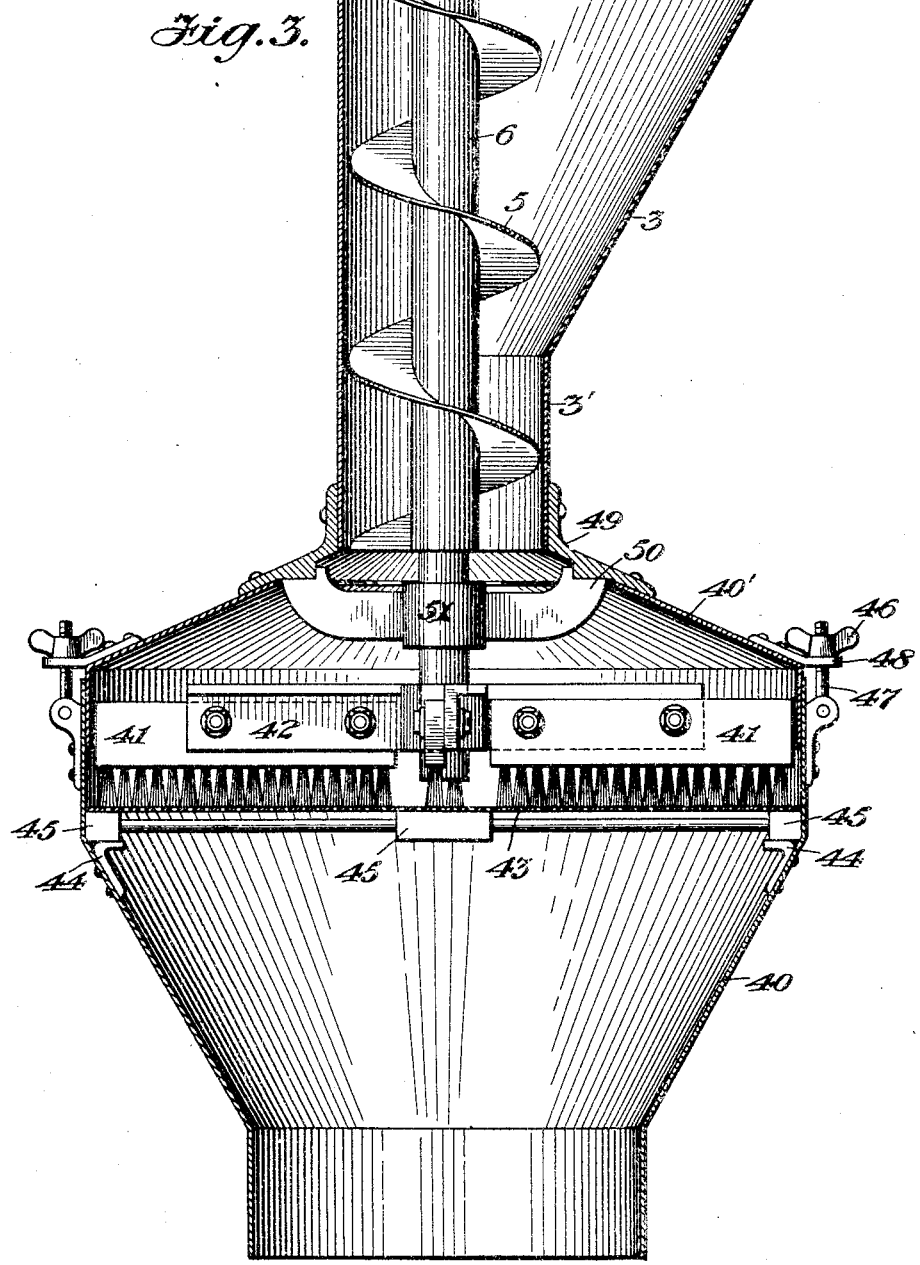

No. 779,650.　　　　　　　　　　　　　　　　　　　　　Patented January 10, 1905.

UNITED STATES PATENT OFFICE.

GEORGE J. HICKS, OF ARDSLEY, NEW YORK.

AUTOMATIC WEIGHING-MACHINE.

SPECIFICATION forming part of Letters Patent No. 779,650, dated January 10, 1905.

Application filed April 28, 1903. Serial No. 154,645.

*To all whom it may concern:*

Be it known that I, GEORGE J. HICKS, a citizen of the United States, and a resident of Ardsley, in the county of Westchester and State of New York, have invented certain new and useful Improvements in Automatic Weighing-Machines, of which the following is a specification.

This invention relates to automatic weighing-machines for accurately determining quantities of material, and especially to a machine for automatically weighing at each operation a quantity of flour sufficient for the purpose of making when mixed and kneaded with the other usual ingredients a batch of dough for the production of a predetermined number of loaves of bread. This weighing of the flour before it is kneaded with the other ingredients in the dough serves to prevent the waste which occurs when the quantity of flour used for producing a given number of loaves of bread is not predetermined.

The main object of this invention is to provide an improved machine capable of weighing automatically a quantity of flour corresponding exactly to the amount necessary to make when mixed with the other ingredients a given number of loaves of bread. In order to accomplish this result, I make use of an automatic weighing mechanism in which flour is fed to a load-receiver or bucket by a supply device the operation of which is stopped automatically at the proper moment to prevent the feeding of any more flour than is necessary to make up the exact predetermined weight.

One of the main features of the invention is the provision of means, controlled by the descent of the load-receiver, for automatically stopping the operation of the supply device at the proper moment, and I preferably employ for this purpose a toggle controlling a power-driven supply device or feeder and controlled in turn by a counterweighted beam independent of the scale-beam, by which the load receiver or bucket is carried, this toggle being preferably supported independently of the weighing mechanism.

It is well known that flour, being made up of very fine particles, is extremely hard to feed, and in a weighing-machine adapted to weigh flour automatically it is necessary to employ a power-driven feeder or force-feed device for feeding the flour positively to the receiver or bucket, as flour will not flow properly out of an opening unless so fed. For this reason I make use of a power-driven supply device which is automatically stopped when the load-receiver descends to a predetermined point, the shutting off of the supply being controlled by an improved and simple mechanism governed by the descent of the bucket.

The present invention is especially designed and intended as an improvement upon that shown, described, and claimed in my companion application, Serial No. 146,838, filed March 9, 1903. The present invention is distinguished from that shown in said prior application in many ways, one important feature of difference being that the shutting off of the supply of material is controlled by a counterweighted beam independent of the scale-beam and preferably mounted on the framework above the load-receiver, this counterweighted beam constituting an actuator for, and therefore serving to operate, a toggle similar to that shown in said prior application. The most important difference, however, between the present invention and that disclosed in said prior application is the employment of a sifter for sifting or screening the material or flour supplied to the load-receiver, this sifter being so positioned with respect to the source of supply to the load-receiver as to constitute a means for controlling directly the flow of material into such load-receiver or bucket. In the preferred construction this sifter coöperates with a power-driven supply device, and the two may be so organized as to operate in unison to stop the operation of the supply device, and thereby cut off the flow of material to the sifter at the same time that the operation of the sifter and the flow of sifted material therefrom into the bucket is stopped.

Other objects and advantages of this invention not hereinbefore described will be hereinafter referred to and are illustrated in the accompanying drawings, in which—

Figure 1 is a side elevation of an automatic weighing-machine constructed in accordance with this invention and embodying an automatic sifter, the parts being shown in the positions they assume after the supply of material has been cut off. Fig. 2 is a rear elevation of the same. Fig. 3 is an enlarged vertical section of the supply device and the sifter coöperative therewith.

In carrying my invention into effect it will be understood that flour to be weighed into charges of predetermined amount may be fed to the load-receiver or bucket of the weighing mechanism in any suitable manner, but will preferably be fed from a bin or hopper by means of a power device the stopping of which is controlled autoimically by the machine, whereas the starting of this device in operation will ordinarily be effected manually, as it is desirable in bakeries to separate the weighing and discharging functions of the mechanism and while performing the one automatically to permit the other to be determined manually, according to the requirements of the bakery. The flour or other material may be contained in a large bin or hopper, (indicated at 2,) which may be kept filled in any suitable manner and may feed the material to a supply-spout, such as 3, the lower end of which is preferably cylindrical, as indicated at 3'. From this supply-spout the material may be delivered to a suitable load-receiver or bucket forming part of the weighing mechanism. This load-receiver is indicated at 4. The object of making the lower end of the supply-spout cylindrical, as shown at 3', is to permit it to receive and coöperate properly with a power-driven supply device shown in the form of a rotary feeder or feed-screw, such as 5, which constitutes the main working element of the force-feeding means for positively conveying the flour to a point where it will be discharged over and adjacent to the bucket. In the construction shown the feed-screw 5 is secured to the lower end of a vertical shaft 6, mounted in a suitable bearing at the upper end of the supply-spout 3, and also having another bearing near its extreme lower end in a portion of the sifter-head, which will hereinafter be described. The shaft 6 may be rotated in any well-known manner and by any suitable means, it having in this case at the upper end thereof a large bevel-gear 8, which meshes with and is driven by a bevel-pinion 9, secured to one end of a horizontal shaft 10, mounted in bearings carried by suitable supports, and which shaft in turn has a driving-wheel 11, which normally turns loosely on the shaft 10 and is adapted to be clutched thereto to rotate such shaft. A clutch of any suitable construction may be employed for this purpose, the band-wheel 11 having in this case a clutch-pin 11', which is adapted to enter a recess in a clutch-sleeve 12, splined to the shaft 10, so as to be shiftable into and out of engagement with the clutch-pin 11'. This sleeve 12 may be shifted into and out of working position by the usual clutch shipper or lever 13, pivoted at a suitable point on one of the supports 14.

The load-receiver or bucket 4 of the automatic weighing-machine may be of any suitable type, but preferably has a bottom closed by a sliding door, such as 15. At its opposite sides the load-receiver has knife-edged pivots 16, which coöperate with wide V-shaped bearings 17 in the upper sides of the arms of a forked counterweighted scale-beam 18, the two forks of which also have knife-edged pivots 19, coöperating with corresponding bearings in suitable supports, such as hangers 20, depending from and secured to suitable supports, such as 21. The bucket 4 may be counterpoised in the usual manner by one or more counterweights, such as 22 and 23, regulable either in position or amount to determine the amount of material to be weighed.

It will be evident from the foregoing description that the movement of the load-receiver and its scale-beam may be utilized to control the shutting off of the supply of material to such receiver, for when the weight or weights on the scale-beam are about poised by the load-receiver and its contents the bucket will begin to descend and will cause a corresponding ascent of the counterweighted end of the scale-beam. These movements of the bucket and its scale-beam in this construction are transmitted to the mechanism for stopping the operation of the power-driven feed device, and the means preferably employed by me is an automatic clutch-shipper actuator for shifting the shipping-lever 13 to its inoperative position. This actuator being controlled in turn by a releasing device governed directly by the scale-beam, it will be seen that through this series of connected parts the clutch-releasing movement is governed by the descent of the bucket to a predetermined point. In the construction shown the counterweighted side of the beam 18 has a stop 25, which moves with the beam, and therefore rises as the load-receiver descends, and this stop constitutes a releasing device for operating certain parts which control the stopping of the power-driven supply device or feed-screw. This stop is intended to coact directly with a device which is connected with the clutch member 12 and which will cause said member to be shifted out of engagement with the pin 11' when the load-receiver descends to the predetermined point. The device which controls said clutch member is intended to hold the same in its clutched position during the feeding of the material into the load-receiver and is preferably a toggle 28, mounted independently of the weighing mechanism, one end of the toggle being pivoted in this case at a fixed point 29, which may be a point in a bracket, such as 30, while the other end of the toggle may be connected to an angle-lever 31, supported at another point on said bracket 30, the end of the angle-lever to which the toggle is not connected being secured in this case to a member which connects with the clutch-sleeve 12 and forms part of the mechanism for actuating the same. The stop 25, carried by the counterweighted end of the scale-beam 18, is preferably located approximately below the center or knuckle of the toggle 28 when the toggle is straight and constitutes a toggle-striking device which is operative to control the release of the sleeve 12 from the pin 11' when the load-receiver descends to the proper point and the toggle-striking device or stop 25 correspondingly rises. The member to which the angle-lever 31 is connected is a long rod 32, the upper end of which is in this construction connected to an actuator, by means of which the sleeve 12 is released from the pin 11'.

The connections between the toggle 28 and the clutch differ radically from those shown in my aforesaid prior application, and one of the principal features distinguishing the present releasing mechanism from that disclosed in said prior application is a counterpoised or counterweighted beam mounted on the framework, preferably at a point considerably above the scale-beam 18, and so constructed and organized as to operate in a different manner from the scale-beam and substantially independently thereof. This beam, which is designated by 33, is held down at one end by the resistance opposed by the straightened toggle 28 and the connections therefrom to the beam 33, while the other end of said beam is weighted, as shown at 33', and constitutes an actuator which becomes effective to operate the shipping-lever 13 and unclutch the sleeve 12 from the band-wheel when the toggle is struck. The pivot of this beam is indicated in Fig. 1, and between its pivot and the weight 33' it is connected, as by means of a link 34, to the end of the lower arm of the shipping-lever 13. Hence whenever the toggle 28 is released the weight 33' immediately tends to actuate all the parts just described and unclutch the members 11 and 12.

It is important that the correctness of the weighing operation and the results attained shall not be vitiated by burdening the scale-beam or the load-receiver with unnecessary work, and in order to obtain the best results it is important to permit the scale-beam to perform only the operation of releasing the holding device or toggle 28 and to provide an independent actuator for accomplishing the actual shifting of the lever 13, and for these reasons I prefer to employ such an independently-mounted actuator as the counterweighted beam 33.

After the weighing of a load the bucket may be emptied by opening the door 15 and permitting the material to flow out into a suitable receptacle or trough. After the bucket is emptied and the sliding door 15 closed again the parts will remain in the positions shown in Figs. 1 and 2 until it is desired to weigh another charge, when the band-wheel 11 may be clutched to the sleeve 12 again. This is preferably accomplished by pulling down on the rod 32 until the toggle 28 is straight again, this rod being continued in the construction shown below its point of connection with the link 31 and terminating in a handle 32' to form a pull-rod. These connections to the sleeve 12 therefore constitute a manually-operated resetting and starting device for starting the weighing operation manually at the will of the attendant, while also constituting an automatic stopping mechanism controlled by the toggle-striking device 25 for shutting off the supply when the bucket contains the proper weight.

The mechanism just described constitutes a complete automatic weighing-machine suitable for weighing predetermined charges of material; but these parts are incapable of screening the material or flour before it enters the bucket. One of the most important features of my present invention being the provision of means for accomplishing this result, I have shown herein between the discharge end of the supply-spout and the load-receiver a sifter-head, such as 40, containing a sifter adapted to thoroughly screen or sift the flour or other material to be weighed, this sifter being so combined with the supply-spout as to constitute a means for automatically controlling the flow of material into the bucket. The sifter proper may be of any suitable type, but is preferably a rotary element which operates when the force-feeder is operating and which stops with said feeder. I deem it desirable to make use of a sifter having a rotary element movable in unison with a rotary feeder, and in the construction shown a plurality of brushes 41 are secured to a frame, such as the four-armed spider 42, secured to the lower end of the shaft 6, the brushes being so placed as to travel in contact with the upper side of a suitable screen 43. This screen is shown movably supported in the lower member of a divided or two-part sifter-head 40, brackets 44 being fastened to the inside of the lower or funnel-shaped member of said sifter-head, as shown in Fig. 3, and a frame 45 being laid on these brackets and serving to support and brace the screen proper. The upper half of the casing of the sifter-head is designated by 40' and may be detachably connected with the lower half by clamp-nuts and screws, such as 46 and 47, the upper member 40' of the casing having a series of ears, such as 48, with recesses in the edges thereof to permit the parts of the casing to be quickly connected or disconnected. The upper member 40' of the sifter-head may be connected to the lower part of the supply-spout 3' by means of a casing 49, the inner surface of which is so shaped as to lock in place a yoke 50, having a lower bearing 51 for the shaft 6.

From the foregoing description of the sifter-head it will be seen that not only is the operation of the power-driven supply device or feed-screw 5 controlled by the automatic stopping and manually-operated starting mechanism, but that the movable element of the sifter is similarly controlled and that the forcing of the flour or other material through the holes in the screen is stopped when the rotation of the brushes is stopped by the automatic uncoupling of the driving-shaft 10 from the band-wheel 11.

What I claim is—

1. In an automatic weighing-machine, the combination with a power-driven supply device, of a pair of independent counterpoised beams, a load-receiver carried by one of said beams, a toggle mounted independently of the load-receiver and connected with the other of said beams and controlling the operation of said beam and the supply device, and a toggle-striking device controlled by the descent of the load-receiver.

2. In an automatic weighing-machine, the combination with a power-driven supply device, of a pair of independent counterpoised beams, a load-receiver carried by one of said beams, a clutch controlling the operation of said supply device and connected with the other of said beams, a clutch-controlling toggle also connected with said other beam controlling the operation thereof, and a toggle-striking device controlled by the descent of the load-receiver.

3. In an automatic weighing-machine, the combination with a power-driven supply device, of a pair of independent counterpoised beams, a load-receiver carried by one of said beams, a clutch controlling the operation of said supply device and connected with the other of said beams, a clutch-controlling toggle mounted independently of the load-receiver and also connected with said other beam controlling the operation thereof, and a toggle-striking device controlled by the descent of the load-receiver.

4. In an automatic weighing-machine, the combination with a power-driven supply device, of a pair of independent counterpoised beams, a load-receiver carried by one of said beams, means controlled by the descent of the load-receiver and operated by the other of said beams for stopping the operation of said supply device, and a manually-operated starting device also controlling the operation of said supply device.

5. In an automatic weighing-machine, the combination with a power-driven supply device, of a pair of independent counterpoised beams, a load-receiver carried by one of said beams, a clutch controlling the operation of said supply device and connected with the other of said beams, a clutch-controlling toggle also connected with said other beam controlling the operation thereof, a toggle-striking device controlled by the descent of the load-receiver, and a manually-operated starting and resetting device also controlling the operation of said supply device and connected with said toggle and its beam.

6. In an automatic weighing-machine, the combination with a supply device, of a counterpoised load-receiver, and a sifter coacting with said supply device and having a rotary element controlling the flow of material into the load-receiver and constructed to deliver material thereto only through the screen-openings in the sifter.

7. In an automatic weighing-machine, the combination with a power-driven rotary supply device, of a counterpoised load-receiver, and a sifter having a rotary element movable in unison with said supply device and controlling the flow of material into the load-receiver.

8. In an automatic weighing-machine, the combination with a rotary feed-screw, of a counterpoised load-receiver, and a sifter having a rotary element movable in unison with said feed-screw and controlling the flow of material into the load-receiver.

9. In an automatic weighing-machine, the combination with a vertical rotary feed-screw, of a counterpoised load-receiver, and a sifter having a rotary element secured to the lower end of said feed-screw and movable in unison therewith and controlling the flow of material into the load-receiver.

10. In an automatic weighing-machine, the combination with a supply device, of a counterpoised load-receiver, a power-driven sifter coacting with said supply device and controlling the flow of material into the load-receiver, and means controlled by the descent of the load-receiver for stopping the operation of said sifter.

11. In an automatic weighing-machine, the combination with a power-driven supply device, of a counterpoised load-receiver, a power-driven sifter coacting with said supply device and controlling the flow of material into the load-receiver, and means controlled by the descent of the load-receiver for stopping the operation of said supply device and said sifter.

12. In an automatic weighing-machine, the combination with a power-driven supply device, of a counterpoised load-receiver, a screen below said supply device, and a rotary element having a plurality of brushes coacting with said screen and controlling the flow of material into the load-receiver.

13. In an automatic weighing-machine, the combination with a supply-spout, of a sifter-head at the end of said spout, a counterpoised load-receiver, and a power-driven sifter in said sifter-head and controlling the flow of material into the load-receiver.

14. In an automatic weighing-machine, the combination with a supply-spout, of a divided sifter-head at the end of said spout, a counterpoised load-receiver, a driving-shaft in said supply-spout, a screen movably supported in said sifter-head, and a rotary element secured to the lower end of said driving-shaft and having a plurality of brushes coacting with said screen and controlling the flow of material into the load-receiver.

Signed at New York, in the county of New York and State of New York, this 7th day of April, A. D. 1903.

GEORGE J. HICKS.

Witnesses:
    CHAS. F. DANE,
    E. M. FAITH.